United States Patent [19]
Rozetti

[11] Patent Number: 5,745,554
[45] Date of Patent: Apr. 28, 1998

[54] SYSTEMS FOR REQUESTING SERVICES USING CARD READING TERMINALS

[75] Inventor: Maks Rozetti, Danville, Calif.

[73] Assignee: Impact With Quality, Inc., Oakland, Calif.

[21] Appl. No.: 683,483

[22] Filed: Jul. 18, 1996

Related U.S. Application Data

[60] Provisional application No. 60/015,534 Apr. 16, 1996.
[51] Int. Cl.⁶ .................................................. H04M 11/00
[52] U.S. Cl. .................................. 379/91.02; 379/93.12; 235/380
[58] Field of Search ................. 379/91, 95, 91.01, 379/91.02, 93.02, 93.04, 93.12, 265, 355, 357; 235/380; 395/241

[56] References Cited

U.S. PATENT DOCUMENTS

| | | | |
|---|---|---|---|
| 5,136,633 | 8/1992 | Tejada et al. | 379/91 |
| 5,181,238 | 1/1993 | Medamana et al. | 379/91 |
| 5,490,251 | 2/1996 | Clark et al. | 379/91 |
| 5,521,966 | 5/1996 | Friedes et al. | 379/91 |
| 5,615,110 | 3/1997 | Wong | 379/91 |

*Primary Examiner*—Stella Woo
*Attorney, Agent, or Firm*—H. C. Chan

[57] ABSTRACT

A method for a service provider to contact a merchant or a customer (requester) is provided. A special card number (e.g., credit card number, debit card number and ATM card number) to a requester. The card number has a set of digits referencing a call center (130) of a service provider. When a requester requests services, the card number and the requester's contact number is sent to a card processing facility (118). The facility (118) notifies the call center (130) of this card number and contact number. The call center (130) obtains information related to this card number (e.g., name and address of the holder) and assigns an agent to contact the requester using the contact number. As a result, the agent can reach the customer and/or merchant and handle complex transactions. Alternatively, the call center (130) can use an automatic outbound calling device to contact the requester automatically, e.g., to deliver a prerecorded announcement.

13 Claims, 2 Drawing Sheets

SYSTEMS FOR REQUESTING SERVICES USING CARD READING TERMINALS

CROSS-REFERENCE TO RELATED PROVISIONAL APPLICATION

This application claims the benefit of U.S. Provisional Application, Ser. No. 60/015,534, filed on Apr. 16, 1996.

FIELD OF THE INVENTION

The present invention relates to systems for remotely requesting services, and more particularly to systems in which customers use card reading terminals to remotely request services from a selected service provider.

BACKGROUND OF THE INVENTION

Credit cards are carried by many people around the world. They are used for purchasing services and products. They can also be used to obtain cash when checks are not accepted (e.g., when traveling overseas).

A credit card is associated with a credit card number. When a customer uses a credit card to initiate a transaction, the credit card number is used to identify the correct account to record the transaction. In order to improve security and operation efficiency, many merchants install point-of-sale (POS) terminals to read data magnetically recorded on a credit card. This data (which includes the credit card number) is electronically transmitted to computer systems maintained by banks and credit card companies. These computer systems, in combination, contain the full records of all the credit card numbers. The status of the appropriate accounts can be determined quickly. The transaction can often be authorized in less than a minute. Thus, the customer can obtain desired products and services immediately. As a result, it is very convenient for customers and merchants to use credit cards to handle a transaction.

Because of the large installed base of POS terminals and credit cards, it is advantageous to maximize the number of services that can be handled and provided by these credit cards and POS terminals. Customers will be more inclined to carry and use credit cards because of the ability to access more and better services. As a result of the higher usage, the revenues of banks, credit card companies and merchants will increase.

SUMMARY OF THE INVENTION

The present invention provides a method for a service provider to contact a merchant or a customer. The mode of contacting could be via a telephone, a pager, fax, electronic mail, or other communication tools used by the customer or merchant.

In one embodiment of the present invention, a merchant or a customer (the "requester") can request a service provider to contact the requester for the purpose of initiating complex transactions (e.g., airplane and hotel reservation). These transactions generally require interaction between the customer and an agent of the service provider. They cannot be handled by simply reading a credit card using a POS terminal and requesting authorization of the transaction.

The present embodiment involves assigning a special card number (e.g., credit card number, debit card number and ATM card number) to a requester. The card number has a set of digits referencing a call center of a service provider. When a requester requests service, the card number and the requester's contact number is sent to a card processing facility. The facility notifies the call center of this card number and contact number. The call center obtains information related to this card number (e.g., name and address of the holder) and assigns an agent to contact the requester using the contact number. As a result, the agent can reach the customer and/or merchant and handle complex transactions. Alternatively, the call center can use an automatic outbound calling device to contact the requester automatically, e.g., to deliver a prerecorded announcement.

In another embodiment of the present invention, a special card number is issued to the requester. The card number has a set of digits referencing a call center of a service provider. This card number is magnetically recorded on a regular card. When the requester requests service from a service provider, a card reading device (such as a POS terminal and an ATM terminal) is used to read this card. The contact number (e.g., a telephone preferably located adjacent to the card reading device) can be entered manually. The card reading device transmits the card number and the contact number to a card communication network, which in turn sends the data to the call center. The call center can obtain information about the requester based on the card number. The call center then assigns an appropriate agent (e.g., based on language skill) to contact the requester. If the needs of the requester cannot be handled by this agent, this agent can transfer the contact to another appropriate agent. Alternatively, the call center can use an automatic outbound calling device to contact the requester.

It should be pointed out that the above described system can also be used on debit card and bank cards.

These and other features of the present invention will become apparent from the following description when read in conjunction with the accompanying drawings.

DETAILED DESCRIPTION OF THE INVENTION

The present invention comprises a novel system for requesting services using point of sale terminals and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

The disclosure below illustrates one example of the present invention. The "customer" and "merchant" used in this disclosure are examples of parties who are interested in using the present method and system to request services from a service provider. The specific communication tools, e.g., telephone and fax, are examples of devices used to contact these parties. It should be noted that the present invention is not limited to these parties and tools. Further, variations of this example can be easily implemented.

Figure 1:
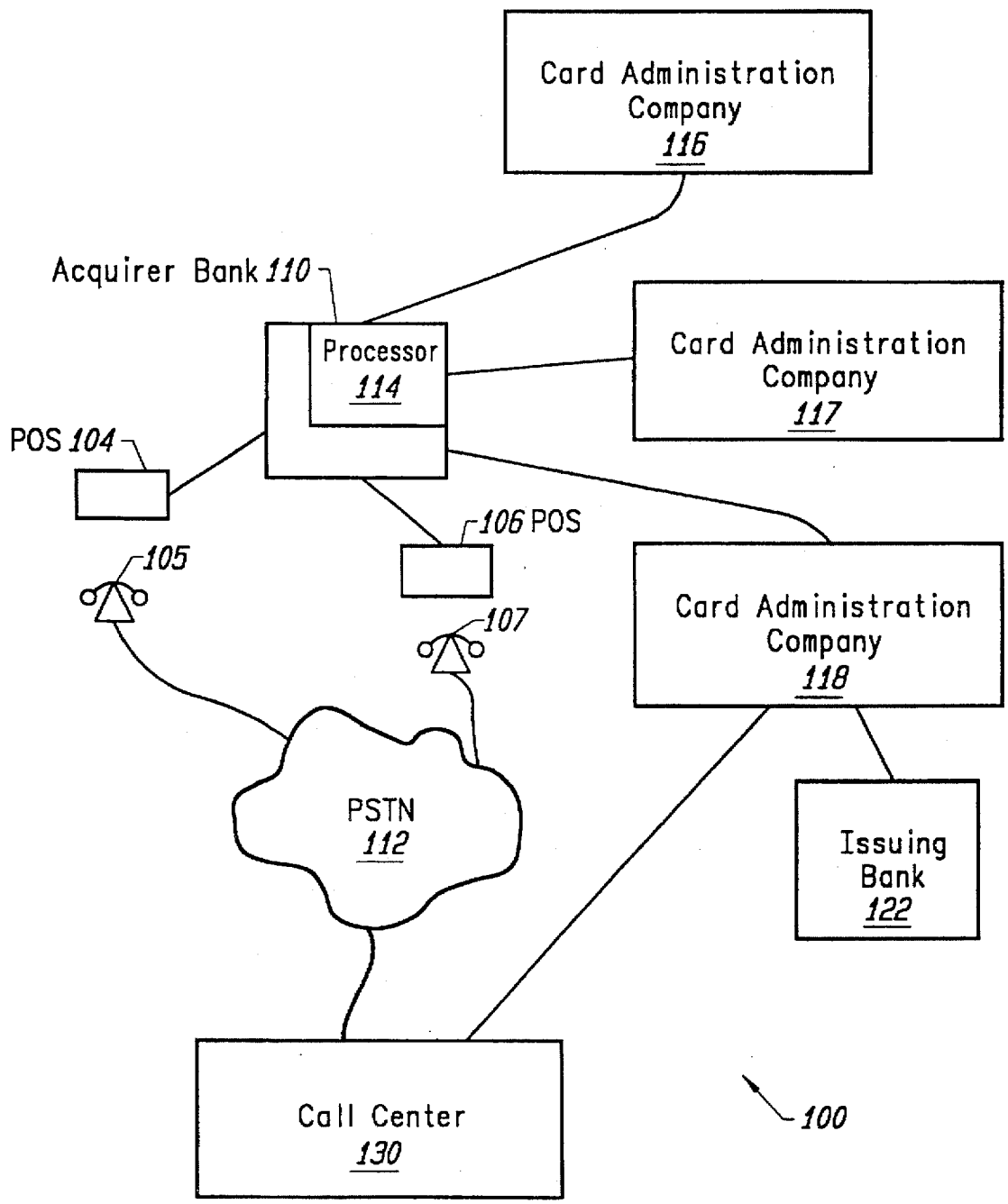
FIG. 1 is a schematic diagram of a remote service requesting system of the present invention.

FIG. 1 is a schematic diagram of a remote service requesting system 100 of the present invention. System 100 comprises a plurality of card reading terminals, such as terminals 104 and 106, that are connected to an acquired bank 110. These terminals could be POS terminals or ATM terminals. The connection could be through a public-switched telephone network (PSTN) or a dedicated line. The card reading terminals are typically located in the facility of various retail merchants or banks. Adjacent to terminals 104 and 106 are telephones 105 and 107, respectively. The terminals can read cards that are capable of storing digital data thereon (e.g., credit cards, debit cards, ATM cards and smart cards). The data is then sent to acquired bank 110.

In FIG. 1, only one acquirer bank is shown. In a preferred implementation of the present invention, a large number of acquired banks are included in the system, and each acquired bank is connected to a large number of terminals.

In one embodiment of the present invention, a string of numerals are recorded (typically magnetically) on credit cards read by the terminals. An exemplary numeral string is shown below:

ABBBBB XXXXX XXXXX, where each "A", "X" and "B" represents a digit selected from the numbers "0" to "9". The first six digits (represented by the symbols "A" and "B") represent the bank identification number ("BIN") or issuer member descriptor ("IMD") of the bank that issues the credit card. The first digit (i.e., "A") further identifies a credit card administration company (e.g., VISA, American Express, or MasterCard) associated with that bank. The rest of the digits (represented by the symbol "X") is a card serial number. In one embodiment of the credit card protocol, the serial number contains approximately 10 digits. The interpretation of these digits are determined by the bank that issues the card. It should be note that the present invention works regardless of the way the symbols "A", "B" and "X" are represented (e.g., they may have different lengths and positioned at different locations).

In the present invention, special BIN/IMDs, such as "000000" or "999999", are reserved to designate various service provider call centers (only one call center 130 is shown in FIG. 1). Examples of services provided by such call centers are travel assistance (such as airplane and hotel reservation), ordering of products not available at the local merchant, and merchant assistance and support. The details of accessing these call centers using the reserved BIN/IMDs will be described below.

When a customer uses his/her card to initiate a transaction (e.g., to purchase a product or service from a merchant), the merchant scans the card using its card reading terminal, such as terminal 104. The merchant manually enters a monetary value of the transaction and other information, if needed, to card reading terminal 104. Terminal 104 then sends the complete set of data to acquired bank 110 using a previously agreed-upon protocol. This data protocol typically contains fields for holding the following information: (i) an identification number of the merchant which uses the terminal, (ii) an identification number of this particular terminal, (iii) the card number of the card read by this terminal, (iii) a code designating the merchant type, (iv) the dollar amount of the transaction, (v) a code designating the type of transaction, and (vi) other data.

One example of implementing the present invention is now described.

If the BIN/IMD encoded on the card corresponds to one of the above-mentioned reserved numbers, there is no need for the merchant to enter a monetary value of the transaction because no financial transaction actually takes place. Instead, the merchant enters the contact number, e.g., the number of telephone 105 which is adjacent to terminal 104. In the present invention, a contact number refers to any number for identifying a requester. It could be a telephone, a fax number, or a pre-arranged code assigned to the requester. This contact number can be stored in the field designated for storing the dollar amount of the transaction. As a result, there is no need to change the above described protocol between the card reading terminals and the connected banks.

Alternatively, the above described protocol can be modified to add a new field specifically used to store this contact number.

Acquired bank 110 is further connected to a plurality of credit card administration companies, such as VISA, MasterCard and American Express. In FIG. 1, these companies are shown as reference numerals 116, 117 and 118. Acquired bank 110 contains a processor 114 which can performs the following operations:

(i) If the BIN/IMD encoded on a card is the same as the BIN/IMD assigned to acquired bank 110, processor 114 directs the data to an account settlement processor (not shown) of acquired bank 110. In this case, the card is issued by acquired bank 110. Thus, acquired bank 110 contains all the bank records of this card. As a result, acquired bank 110 can authorize or deny this transaction by reviewing the financial record thereat. Consequently, there is no need to send the transaction data to any card administration company.

(ii) If the BIN/IMD on a card is different from the BIN/IMD of acquired bank 110, the financial record of this card is located in another bank. Processor 114 determines the identity of the card administration company from the first digit (i.e., the above described symbol "A") of the card's number. Processor 114 then sends the transaction data received from terminal 104 to the appropriate card administration company, which in turn sends the transaction data to the bank having a BIN/IMD which matches the BIN/IMD encoded on the card. Processor 114 may have to format the transaction data received from the card reading terminals into a protocol acceptable by the card administration company.

Upon receiving the data from acquired bank 110, the card administration company, such as company 118, determines the bank which issues the card (such as issuing bank 122) by using the BIN/IMD number encoded on the card. The issuing bank is the bank which typically keeps the financial record of the card. Thus, company 118 sends the data to issuing bank 122 for authorizing the transaction. It this sense, company 118 functions as a switch for routing data to appropriate banks. Issuing bank 122 reviews the financial record for the card which originates the data to determine whether the transaction should be authorized. Issuing bank 122 notifies card administration company 118 about its decision, which in turn sends the notification to terminal 104.

It should be noted that the acquired bank and the issuing bank may delegate third parties (e.g., a large data processing center) to handle the above described computer processing instead of handling it in-house.

If the BIN/IMD is one of the reserved call centers (e.g., call center 130), card administration company 118 sends the transaction data to the designated call center. As pointed out above, the transaction data contains the contact number of the requester, e.g., the telephone number of telephone 105 adjacent to terminal 104. An agent in call center 130 can initiate a call to telephone 105 using the telephone number embedded in the data sent by terminal 104. Alternatively, an automatic outbound calling device in call center 130 can initiate the call. As a result, the customer or merchant can be contacted directly.

In some situations, a credit card company may wish to talk to a customer who has just initiated a transaction (e.g., to inform an out-of-town customer of unusual activities related to his credit card account). In the prior art method of handling these situations, the merchant has to tell the customer to contact the credit card company. The customer then looks for a telephone and place a phone call. This method incurs considerable expenses and delay. The present invention can be used to provide a better solution. The merchant can substitute a reserved BIN/IMD for the original BIN/IMD in the customer's credit card and enter the contact number, e.g., the telephone number of telephone 105. An agent of the credit card company can immediately call and talk to the customer. Alternatively, an automatic outbound calling device of the credit card company can contact the customer for the purpose of, e.g., delivering a prerecorded message.

Figure 2:
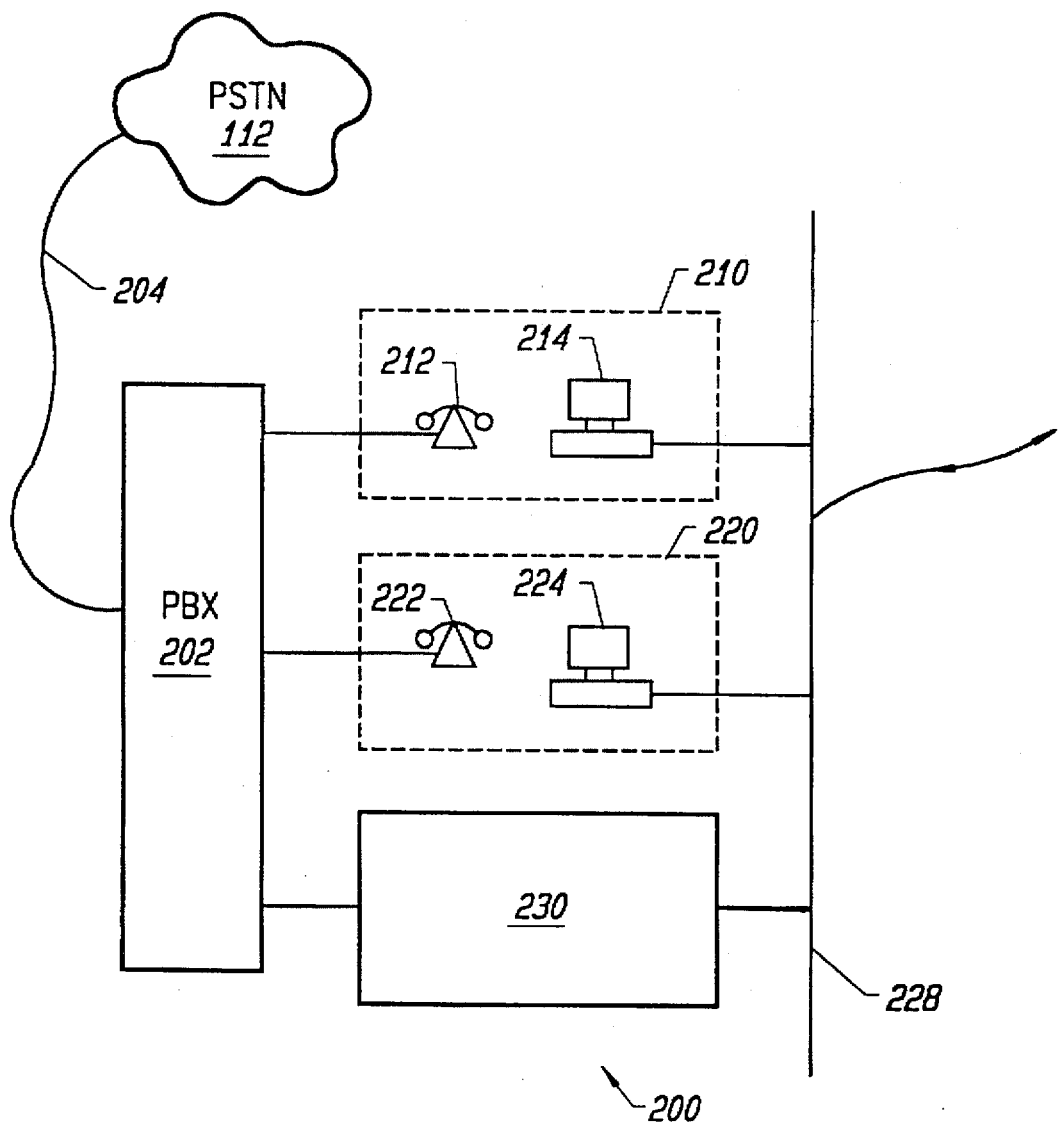
FIG. 2 is a block diagram of a call center of the present invention.

FIG. 2 is a block diagram of an exemplary computer-telephony integration ("CTI") system 200 which could be used in call center 130. It comprises a PBX 202 (or other types of switching device) for communicating with PSTN 112 via a high speed telephone line 204. Call center 130 also comprises a plurality of agent stations each containing a telephone and a computer. In FIG. 2, two stations 210 and 220 are shown. Station 210 contains a telephone 212 and a computer 214. Station 220 contains a telephone 222 and a computer 224. Telephones 212 and 214 are connected to PBX 202. Computers 214 and 224 are connected to a local area network 228. Call center 130 also comprises a CTI software 230. Software 230 contains a router for routing telephone calls to appropriate telephones and a database. The database could contain information of all the agents and the status of all calls. Software 230 also contains routines to select appropriate agent to interact with customers using information in the database.

Agents are assigned to agent stations. When agents log in, they can enter their identification information to computers 214 and 224, which is transmitted to CTI software 230. Information on the agents (such as language skill, knowledge of products, etc.) could be used by CTI software 230 as some of the factors in selecting an appropriate service agent to interact with a particular user.

Local area network 228 is connected to the computer in card administration company 118. As a result, information on credit card holders can be accessed by call center 130.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

I claim:

1. A method by a requester to request services from a service provider using a card reading device, comprising the steps of:

assigning a card number to said requester, said card number having a set of digits referencing a call center of said service provider;

reading said card number using said card reading device;

entering, using a device associated with said card reading device, a contact number associated with a communication device located in the proximity of said card reading device;

sending said card number read by said card reading device and said entered contact number to a card processing facility;

forwarding, by said card processing facility, said contact number to said call center associated with said card number; and contacting said requester by an agent of said call center using said contact number forwarded by said card processing facility.

2. The method of claim 1 wherein said contact number comprises a telephone number.

3. The method of claim 1 wherein said contact number comprises a fax number.

4. The method of claim 1 wherein said contact number comprises a code associated with said requester.

5. The method of claim 1 wherein said contact number comprises a pager number.

6. The method of claim 1 wherein said contacting step comprises the step of calling said requester using an automatic outbound calling device.

7. The method of claim 1 wherein said contact number is a telephone number, and wherein said step of contacting said requester by said agent comprises the step of calling said requester by said agent using said telephone number.

8. The method of claim 1 wherein said card reading device is an automatic teller machine and said card number is an automatic teller machine card number.

9. The method of claim 1 wherein said card reading device is a point-of-sale terminal and said card number is a credit card number.

10. The method of claim 1 wherein said card reading device is a point-of-sale terminal and said card number is a debit card number.

11. A method by a requester to request services from a service provider using a card reading device, comprising the steps of:

assigning a card number to said requester, said card number having a set of digits referencing a call center of said service provider and a set of digits referencing said requester;

reading said card number using said card reading device;

entering a contact number associated with a communication device located in the proximity of said card reading device;

sending said card number read by said card reading device and said entered contact number to said call center associated with said card number;

obtaining information relating to said requester based on said card number;

assigning an agent in said call center to contact said requester based on said information; and contacting said requester by said agent of said call center using said contact number.

12. The method of claim 11 wherein said contact number comprises a telephone number.

13. The method of claim 11 wherein said contact number comprises a code associated with said requester.

* * * * *